United States Patent [19]

Lundberg et al.

[11] Patent Number: 4,718,445
[45] Date of Patent: Jan. 12, 1988

[54] POSITION INDICATOR FOR A ROTARY VALVE ACTUATOR

[75] Inventors: Charles Lundberg, New London, Minn.; Anthony C. Summers, Houston, Tex.

[73] Assignee: General Signal Corporation, Stamford, Conn.

[21] Appl. No.: 919,495

[22] Filed: Oct. 16, 1986

[51] Int. Cl.⁴ .................. F16K 51/00; F16K 37/00
[52] U.S. Cl. ........................... 137/15; 137/315; 137/553; 137/556; 116/201; 116/277; 116/DIG. 21
[58] Field of Search .......... 116/201, DIG. 21, 277, 116/DIG. 14; 137/553, 556, 15, 315

[56] References Cited

U.S. PATENT DOCUMENTS

| | | | |
|---|---|---|---|
| 141,839 | 8/1873 | Walsh | 116/125 |
| 1,312,603 | 8/1919 | Wood | 116/DIG. 21 |
| 2,140,934 | 12/1938 | Dopp | 116/125 |
| 2,239,842 | 4/1941 | Evans | 116/125 |
| 2,367,651 | 1/1945 | Stone | 116/125 |
| 2,407,944 | 9/1946 | Bassett | 116/125 |
| 2,767,681 | 10/1956 | Pontius | 116/125 |
| 2,829,538 | 4/1958 | Mueller | 116/277 |
| 2,959,149 | 11/1960 | Schwenk | 116/125 |
| 3,238,968 | 3/1966 | Pecis | 137/556 |
| 3,785,338 | 1/1974 | Visser | 116/125 |
| 3,804,056 | 4/1974 | Lee et al. | 116/125 |
| 3,851,386 | 12/1974 | Ellzey, Jr. | 116/201 |
| 3,994,255 | 11/1976 | Thompson | 116/125 |
| 4,198,030 | 4/1980 | Jackson et al. | 137/554 |
| 4,494,565 | 1/1985 | Sinclair | 137/555 |

Primary Examiner—A. Michael Chambers
Attorney, Agent, or Firm—Barnes & Thornburg

[57] ABSTRACT

A position indicator for and method for applying the same to valve arrangements having a first strip attached to a first movable part and a second strip attached to a second stationary part of the valve arrangement. The strips have a line arranged down the middle with contrasting lines on either side for easy alignment of the indicator strips. The indicator strips are initially applied as a single strip to the first and second parts of the valve arrangement and then severed at a point between the first and second parts when the valve arrangement is in a known preferred position.

1 Claim, 4 Drawing Figures

POSITION INDICATOR FOR A ROTARY VALVE ACTUATOR

BACKGROUND AND SUMMARY OF THE INVENTION

The present invention relates generally to a position indicator for rotary valve actuators, and more specifically to a position indicator which indicates when the valve is in a desired position.

It is often desirable to know the position of the closure mechanism within a valve body for determining the flow of a medium passing through the valve. This is of particular importance in systems requiring frequent and accurate adjustment of the valve's medium flow. Additionally, because valve actuators are often located in areas which are poorly lighted, it is desirable to have an indicator means which can be easily read in dark environments.

Various methods have been previously devised to provide some means of indicating the position of the valve. U.S. Pat. No. 2,959,149 to Schwenk describes an underground rotary valve having an indicating disc positioned on and arcuately movable with the valve shaft. When one of two markings on the disk are aligned with one mark positioned on the housing itself, the position of the valve closure member may be known. Another valve described in U.S. Pat. No. 2,767,681 to Pontius includes an indicator pointer which is keyed to rotate with the valve stem by a differential gear. A corresponding indicator plate journalled on the valve stem is calibrated for indicating the open and closed positions of the valve. Another valve position indicator described in U.S. Pat. No. 2,140,934 to Dopp is formed by a vertical cut made into the side of the valve stem. The vertical position of this cut corresponds to a right angle of the flow direction within the valve body to indicate when the valve is in a closed position. Because the above position indicators require additional parts such as discs or further manufacturing such as making cuts on the valve stem or body, these indicators are both time consuming and costly to implement. Additionally, these indicators are not easily implemented on valves already in use or easily readable in poorly lighted environments.

It is, therefore, an object of the present invention to provide an inexpensive and accurate means for indicating the position of the closure mechanism within a valve arrangement.

Another object of the present invention is to provide an inexpensive and accurate position indicator which may be easily implemented on valves already in use.

Still another object of the present invention is to provide an inexpensive and accurate position indicator which is easily readable under all types of lighting conditions.

It is still another object of the present invention to provide an inexpensive and accurate position indicator which is easily replaceable upon being worn.

These and other objects are attained by providing a position indicator means having a first position indicator strip arranged on a valve actuator stem or shaft and a second position indicator strip arranged on a stationary portion of a valve body such as a bonnet pad, compression plate or actuator body. The strips are positioned such that when they are in alignment with each other, the position of the closure mechanism within the valve is in a fully closed or fully opened position or any intermediate position for which an accurate indication is desired.

The indicator strips initially comprise a single strip which is applied to both the rotor valve actuator shaft and a stationary surface when the closure mechanism is in a preferred position. After the strip is attached to the respective parts of the valve, it is severed at a point where the actuator and stationary surface meet, thereby providing accurate alignment of the two strips when the valve is in the preferred position. Depending upon the valve structure, the strips can be attached to either a top or side part of the valve actuator shaft for providing respective top or side views of the same.

The strips can be formed from a plastic, aluminum or other inexpensive material having an adhesive on one face of the strips for attaching the same to the respective parts of the valve. The other face of the strips include a longitudinal area down the middle which is bordered by contrasting areas on either side. Use of fluorescent materials for these areas may be used to further improve readability of the indicators in poorly lighted environments.

Because the strips are applied to the respective valve parts with an adhesive, they can be easily replaced by a new strip when the old strips become worn.

Other objects, advantages and novel features of the present invention will become apparent from the following detailed description of the invention when considered in conjunction with the accompanying drawings.

DETAILED DESCRIPTION OF THE DRAWINGS

Figure 1:
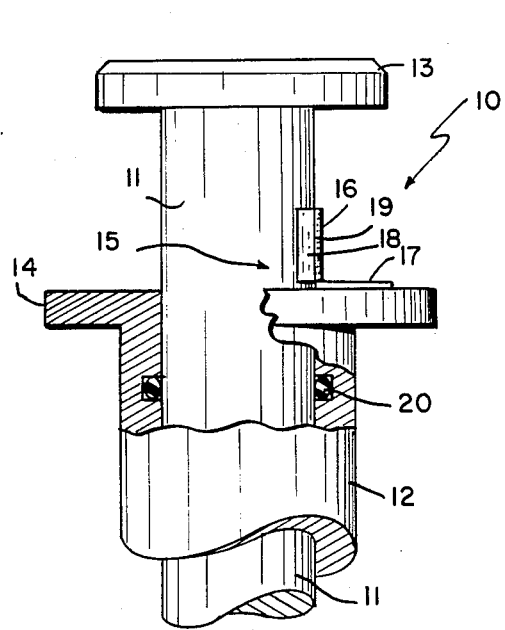
FIG. 1 represents a cut away side view of the valve arrangement embodying the present invention with the indicator on the valve body when the valve is in the desired position.
Figure 2:
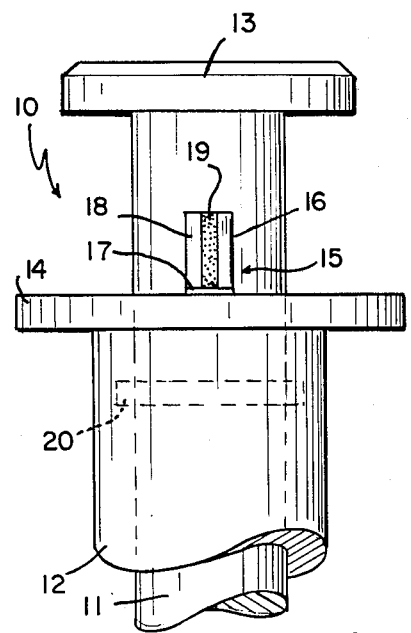
FIG. 2 represents a front view of the valve arrangement of FIG. 1.

Referring to FIGS. 1 and 2, a preferred embodiment shows a shaft 11 and body 12 forming the top portion of a valve arrangement 10. An O-ring seal 20 is provided between the shaft 11 and the body 12. The valve shaft 11 includes a handle 13 at one end and a closure mechanism (not shown) at the other end. The type of closure mechanism will depend on the type of valve arrangement, such as a rotary actuator for a butterfly or ball valve. A bonnet pad 14 is formed on the valve body having a planar surface transversed to the shaft 11.

A position indicator means 15 comprises at least two strips, 16, 17, having distinctive contrasting areas 18, 19 on a first face for easy alignment and readability. An adhesive material on a second face of the strips 16, 17 is used for attaching the same to the vertical surface of the valve shaft 11 and the planar surface of the bonnet pad 14 respectively. The indicator strips 16, 17 are arranged on the respective parts 11, 14 such that the valve mechanism (not shown) is in a closed position when the two position indicator strips 16 and 17 are aligned with each other. The position indicator strips, however, may also be arranged such that they are aligned when the closure mechanism is in other known preferred position.

Figure 3:
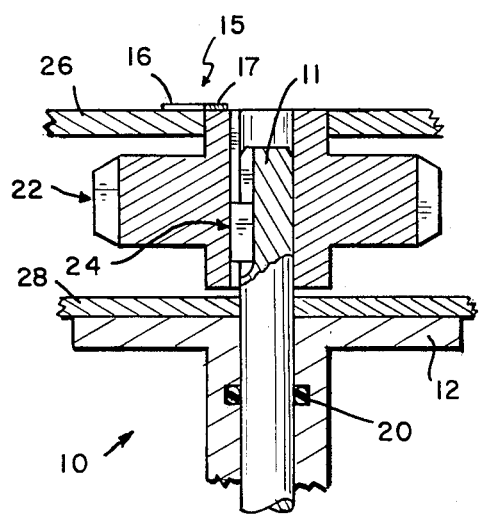
FIG. 3 represents a cut away side view of a second preferred embodiment of the prevent invention with the indicator on the actuator housing.

The indicator strip may also be applied to the valve actuator and the valve actuator housing as illustrated in FIG. 3. The actuator shaft 11 is shown extending from the valve housing 12 and is sealed thereto by an O-ring 20. An actuated drive member 22 is secured to the actuator shaft 11 by a key 24. Actuating housing walls 26 and 28 encompass the actuator drive member 22 and the shaft 11. The position indicator means 15 is shown having one strip 16 on the stationary actuator housing 26 and a second strip 17 on the top of the actuator drive member 22. The actuator strips 16 and 17 are in a common plane and may be viewed from the top.

Figure 4:
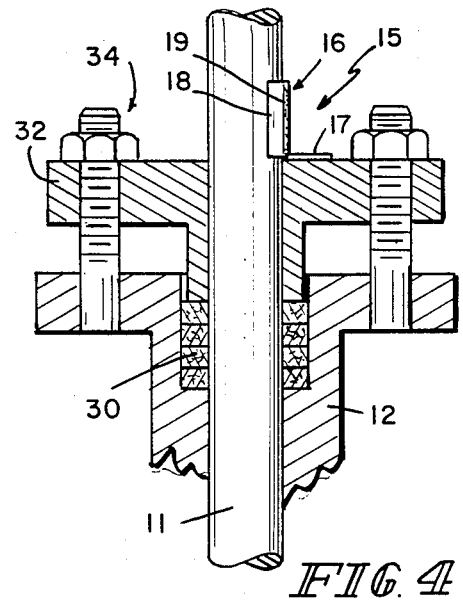
FIG. 4 represents a cut away side view of the present invention with the indicator on a compression plate.

The indicator means 15 having two portions 16 and 17 at right angles to each other may also be applied to a valve having compression plates as illustrated in FIG. 4. The valve body 12 is shown as receiving the actuator shaft 11 with the plurality of seals 30. A compression plate 32 is secured to the body 12 by fasteners 34 and compressed the stacked seals 30. As in FIG. 1, the indicator means 15 includes an indicator strip 16 on the rotary actuator shaft 11 and a portion 17 on the stationary portion which in this case is the compression plate 32.

In the preferred embodiments, the position indicator strips are formed from a single strip 15, which is applied to both the rotary member and the stationary member by the adhesive backing. When the closure mechanism is in a desired position, the single strip 15 is cut at a point between the respective parts, thereby providing an accurate alignment between the two strips 16, 17 for indicating the desired position of a valve. This operation can be performed during or after assembly of the valve arrangement at minimal cost and time.

From the preceding description of the preferred embodiments, it is evident that the objects of the invention are attained, and although the invention has been described and illustrated in detail, it is to be clearly understood that the same is by way of illustration and example only and is not to be taken by way of limitation. The spirit and scope of the invention are to be limited only by the terms of the appended claims.

What is claimed is:

1. A method of assembly of a position indication means for a valve arrangement having a first and second part, said first part being journalled for rotation within said second part for varying flow of a medium within said second part, wherein said method comprises:
   (a) positioning said first part within said second part of said valve arrangement in a preferred position;
   (b) attaching said indicator strip to said first and second parts;
   (c) severing said indicator strip prior to further rotation at a point between said first and second part for providing a first and second strip on said first and second part having adjacent edges of said first and second strips respectively aligned at said preferred position.

* * * * *